Jan. 13, 1931.  G. A. MILLAR  1,788,927
GLASS WORKING MACHINERY
Filed Feb. 26, 1927  4 Sheets-Sheet 1

INVENTOR
George A. Millar
HIS ATTORNEY

Jan. 13, 1931. G. A. MILLAR 1,788,927
GLASS WORKING MACHINERY
Filed Feb. 26, 1927 4 Sheets-Sheet 2

INVENTOR
George A. Millar
BY
Thos. H. Brown
ATTORNEY

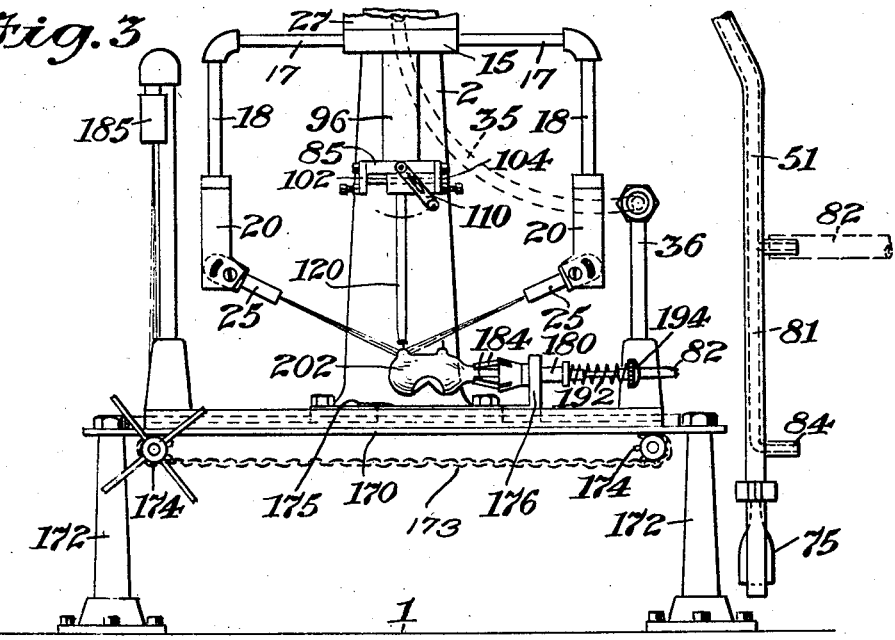
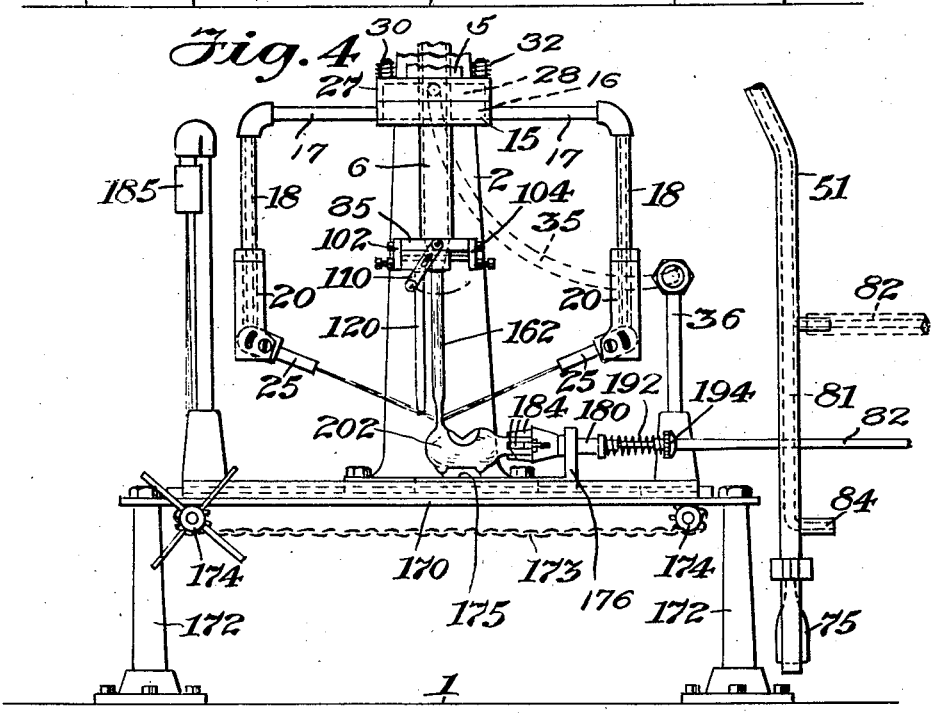

Jan. 13, 1931. G. A. MILLAR 1,788,927
GLASS WORKING MACHINERY
Filed Feb. 26, 1927 4 Sheets-Sheet 4

INVENTOR
George A. Millar
BY
HIS ATTORNEY

UNITED STATES PATENT OFFICE

GEORGE A. MILLAR, OF RIDGEFIELD PARK, NEW JERSEY, ASSIGNOR TO GENERAL ELECTRIC VAPOR LAMP CO., OF HOBOKEN, NEW JERSEY, A CORPORATION OF NEW JERSEY

GLASS-WORKING MACHINERY

Application filed February 26, 1927. Serial No. 171,292.

The present invention relates to methods and apparatus for working glass into manufactured articles, and particularly to methods and means for making and blowing articles of hollow glassware having metal wires or similar parts sealed through the walls thereof and having other hollow glass parts joined thereto.

It is further an object of the invention to provide method and apparatus for working two glass parts to fuse them together and for sealing metal parts to or through glass walls to form an article of the character described. It is of course, to be understood that the methods and apparatus of the invention are applicable generally in the arts.

Various other objects and advantages of the invention will be obvious from the following particular description of one form of apparatus and from the method set forth embodying the invention or from an inspection of the accompanying drawings; and the invention also consists in certain new and useful methods and features of construction and combinations of parts hereinafter set forth and claimed.

Figure 1:
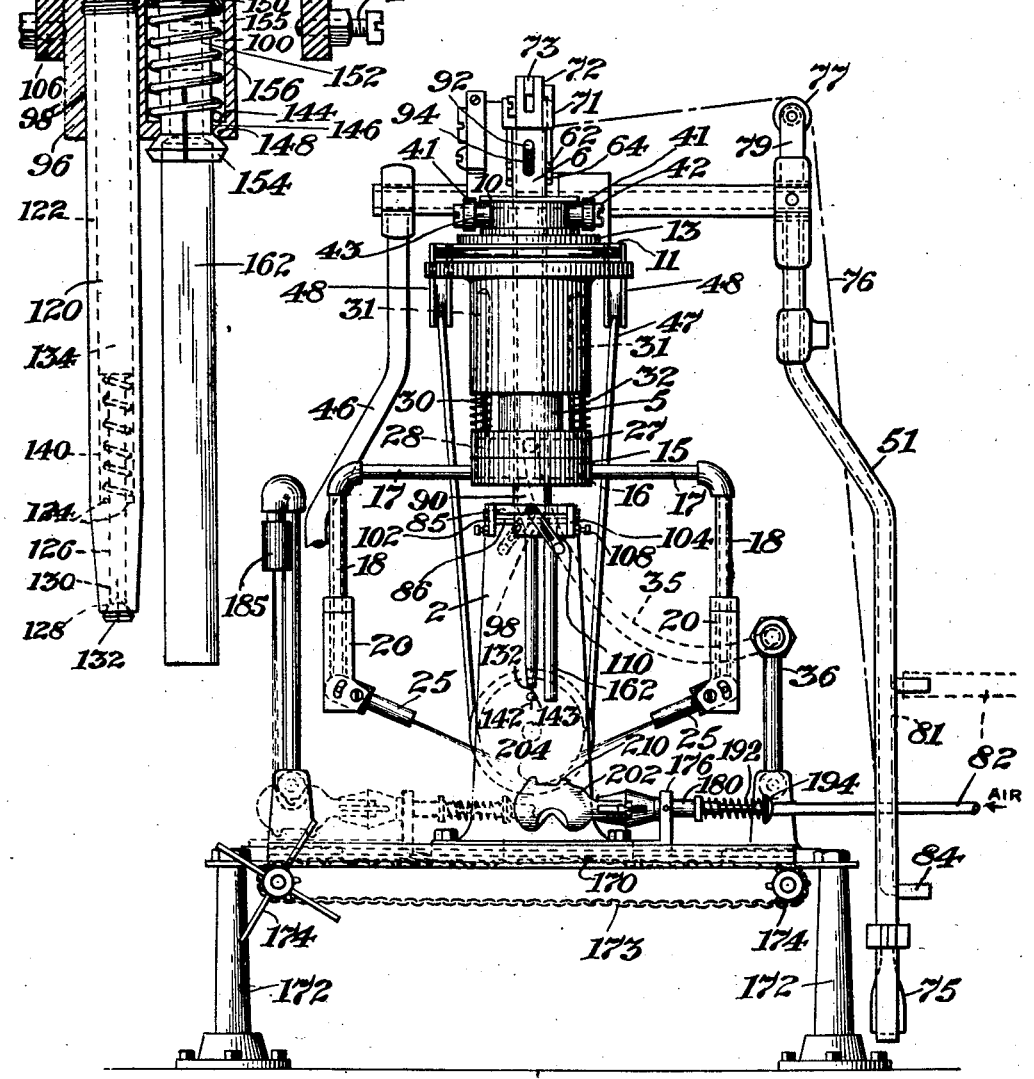
Figure 2:
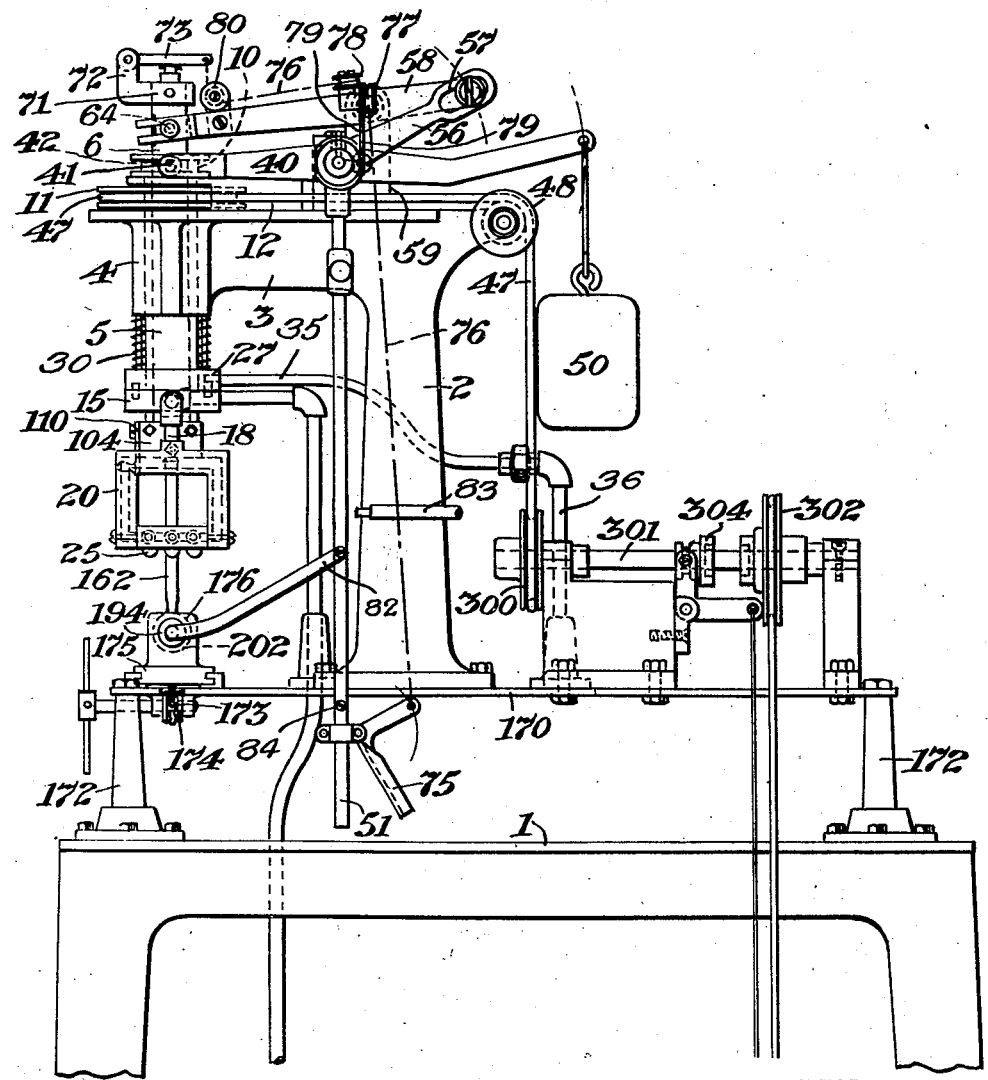
Figure 5:
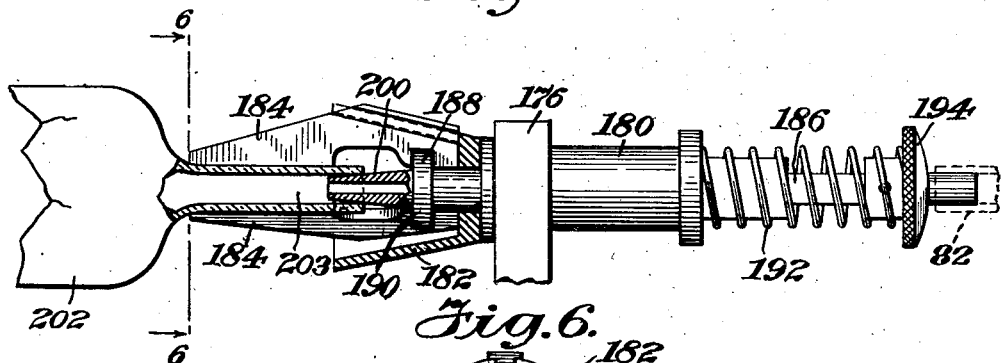
Figure 6:
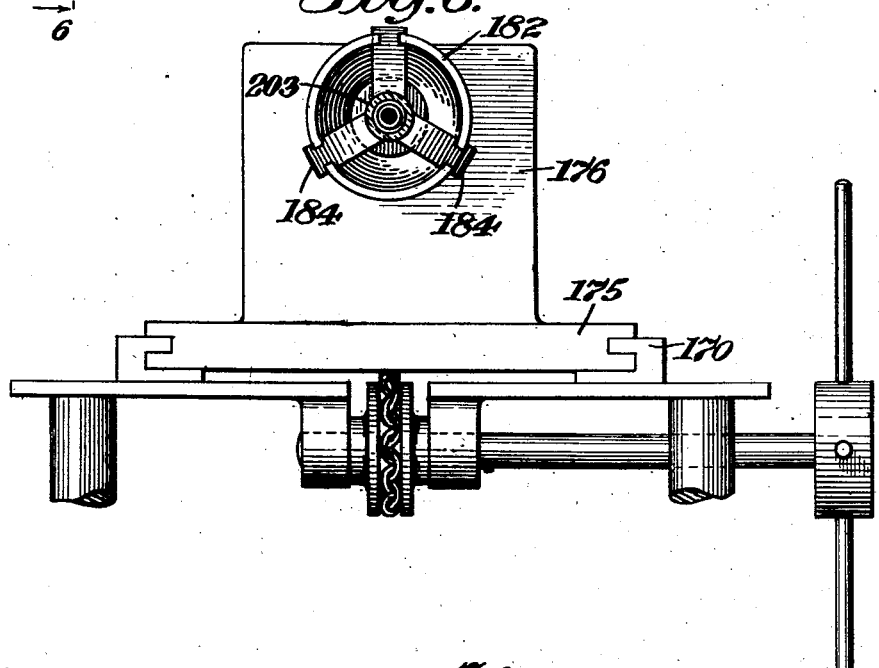
Figure 7:
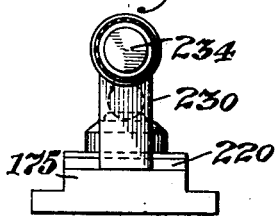
Figure 8:
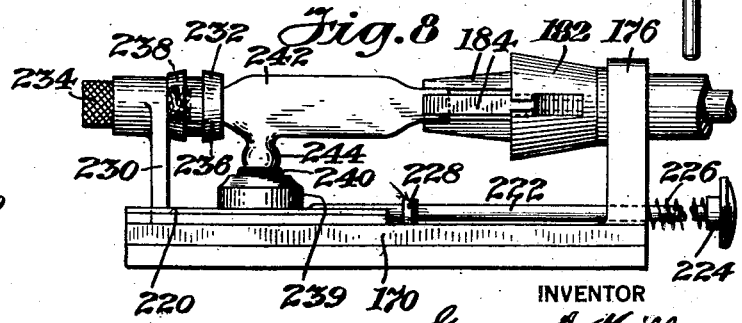

In the accompanying drawings there is shown for purposes of illustration one form of apparatus embodying the invention, in which Fig. 1 is a front elevation view of apparatus embodying the invention, Fig. 2 is a side elevation view of Fig. 1, Fig. 3 is a front elevation view of lower part of machine showing the introduction of bead and wire, Fig. 4 is a similar elevation view to Fig. 3 showing the tubulating operation, Fig. 5 is a longitudinal view of details of the apparatus, Fig. 6 is an elevation view of work holding parts embodied in the apparatus of Fig. 1, Figs. 7 and 8 are respectively end and front elevation views of work holding parts.

Fig. 9 is a vertical sectional view of other work holding parts.

In the drawings the table 1 supports the standard 2 having the arm 3 projecting therefrom forwardly at its upper end. At its forward end said arm 3 supports the block 4 having slidably and rotatably mounted therethrough vertical hollow cylinder 5 through which in turn is slidably mounted the hollow shaft or spindle 6. At the upper end of cylinder 5 is mounted the annularly grooved double flange member 10. Slidably mounted on said cylinder 5 between member 10 and block 4 is mounted the pulley 11 which drives said cylinder 5 through a sliding key and keyway arrangement not shown but well known and common in the art. The member 12 fixed to the top of said arm 3 and having an extension 13 projecting over said pulley 11 serves with the upper end of block 4 to limit the movement of said pulley vertically. At the lower end of cylinder 5 is mounted the flange 15 concentrically therewith which has formed in its upper surface the annular channel 16 which connects with the pipes 17 mounted horizontally one on each side of said flange 15. Said pipes 17 carry at their outer extremities pipes 18 which connect therewith and therethrough to said channel 16 and carry at their lower ends the hollow fire members 20, which carry fire nozzles 25, 25 directed inwardly and downwardly toward the axis of rotation of said cylinder 5. About said cylinder 5 between head 4 and flange 15 is movably mounted the annular member 27 which rests on said flange 15 and has formed in its lower surface the channel 28 which registers with channel 16. The rods 30 fixed to the upper side of said ring 27 extend upwardly and fit slidably into the vertical holes 31 formed in said head 4 and serve to prevent rotation of said ring 27. During rotative movement of said flange 15 the compression springs 32 mounted about said rods 30 and pressing against said head 4 and said ring 27 serve to hold said ring 27 against said flange 15 to thereby secure a gas tight joint therebetween. Mounted to said ring 27 and communicating with said channel 28 is one end of the flexible hose 35 the other end of which is connected to the pipe 36 which is in turn connected to a suitable source of gas supply not shown. On said arm 3 and back of said cylinder 5 is pivoted an arm 40 which carries at each of its fork-tips 41 pin members 42 which project one on either side in to the channel of member 10 and have mounted thereon the roller members 43. Said pivoted arm is connected at its pivot to the lever 46 which serves as a handle for raising and lowering the end of said arm and thereby for raising and lowering said cylinder 5. The annular channel member 10 with which said pin members 42 engage provides actuating engagement between said pivoted arm and said sleeve 5, when said sleeve 5 is rotated by means of the pulley 11 as hereinafter more fully described. Also fixed to said arm 40 at its pivot and extending backwardly is an arm which carries at its outer end a counter weight 50 which tends to hold said cylinder 5 and thereby said burner members 20 at an upper limit of vertical movement.

Rotational movement is imparted to said fires 25, 25 by means of said pulley 11 which is in turn actuated through the belt 47 passing over pulleys 48, 48 to another pulley 300 which is mounted on a counter shaft 301 shown in Fig. 2 which in turn is driven by a suitable pulley 302 which connects therewith through a clutch 304, said pulley being actuated by suitable means not shown, said clutch being movable into and out of driving engagement in the usual manner.

The lever 51 is fixedly connected to the arm 56 which extends backwardly and upwardly and has formed therein near its outer end the longitudinal slot 57. Said lever 51 and arm 56 are pivoted at their juncture on said arm 3. Above said arm 40 is mounted the lever 58 which is pivoted between its ends at a point to the rear of the pivots of arms 40 and 56 and on the bracket member 59 carried by said standard 2. At its forward end said arm 58 carries the fork 62 which straddles the upper end of said shaft 6, each leg of said fork being itself formed into a fork and straddling the pin 64 mounted one on each side of said shaft 6.

Said hollow shaft 6 carries at its upper end member 71 screwed thereto which in turn carries a post 72 projecting upwardly and in front of the axis of said shaft 6 and having pivoted thereto the lever 73 which extends over and across the center of the end of the shaft 6 and terminates at a little distance therebeyond. For depressing said lever 73 the bell crank handle 75 is mounted at the handle end of the handle lever 51 and is connected to said lever 73 by means of a chain or thong 76 which passes over pulleys 77 and 78 mounted respectively on standard 79 at the pivoted end of handle lever 51 and lever 58 near its pivot, and over the pulley 80 mounted below the end of lever 73 on the lever 58 near its forked end.

At its lower end said handle lever 51 is hollow, having the longitudinal passageway 81 formed therein which at its upper end connects with flexible hose 82 and to a source of air pressure by the flexible hose 83, and at its lower end connects with an exhaust pipe 84 which terminates close to the handle of said crank 75 so that the operator can at the same time operate said handle 51 and control the air pressure in a body of hollow glass connected to said hose 82 by regulating the flow of air from said pipe 84.

Said hollow shaft 6 carries at its lower end the block member 85 having formed therein the horizontal slideways 86 which extend transversely of the front of the machine. Connecting and aligned with the central opening of said hollow shaft 6 is the vertical opening 88 through said block 85 and extending through said opening 88 and upwardly through said hollow shaft 6 is the spindle 90 which terminates above the upper end of said shaft 6 under said lever 73. In said hollow shaft 6 and about said spindle 90 is a spring, not shown, which tends to hold said spindle mounted at an upward limit of movement at which the lower end thereof is at or just above the lower end of said opening 88. A pin 92 fixed in said spindle 90 and extending through the longitudinal slot 94 in the side of said shaft 6 serves to limit the upward and downward movement of said spindle 90 in said hollow shaft 6.

Slidable in the channels 86, 86 of said block 85 is the block 96 which extends downwardly from block 85 and has formed therethrough the vertical circular passages 98, 100 which at different positions of said block 96 on the slideway of said block 85 register and align with said opening 88. At either end of said block 85 the plates 102 and 104 serve to limit the movement of said block 96 on said block 85. In said plates 102 and 104 the set screws 106 and 108 respectively serve to change the limits of movement of said block 96 on said block 85. A lever 110 pivoted to said block 85 having a longitudinal slot therein through which extends a pin fixed to said block 96 serves to slide said block 96 on said block 85 in either direction.

In said opening 98 (see Fig. 9) and extending from the upper end thereof downwardly through and terminating below said block 96 is the sleeve 120 which at its upper end threads into said block 96 and forms with other parts herein described a chuck unit adapted for holding a piece of wire for example and operable by said spindle 90 by a downward movement thereof. Said sleeve 120 has extending from the upper end thereof a central opening 122 which terminates near the lower end at a shoulder 124 from which there extends to the lower end of the tube a smaller central opening 126, at which lower end there is formed a conical counter sink 128, and slidable longitudinally in said opening 126 is a sleeve 130 which is of spring metal and which is split upwardly from its lower end and has formed thereat the clamping jaws 132, 132. The spring of said member 130 at the split portion tends to hold said jaws 132, 132 separate and said jaws 132, 132 have an outward conical surface having an angle equal to or greater than the angle of said counter sink so that movement of said member 130 in said opening 126 to bring the outer conical surface of said jaws 132, 132 against the surface of said counter sink 128 will cause a movement of said jaws toward each other. A rod 134 fixed to said member 130 extends upwardly through said central opening 122 and extends to the top of said sleeve 120 in the position for closing said jaws 132, 132. A compression spring 140 having its upper end bearing against the lower side of said rod 134 and having its lower end bearing against said shoulder 124 tends to hold said chuck jaws 132, 132 in the closed position. In Fig. 1 is shown held by said jaws 132, 132 the wire 142 which has formed thereon the glass bead 143.

Said opening 100 extends downwardly from the top surface of said block 96 and terminates at a shoulder 144 from which extends downwardly the bore 146 to which from the lower surface of block 96 extends the counter sink surface 148. In the upper end of said opening 100 is mounted the slidable plug or collar 150 having a central bore aligned with said bore 146. Threaded in the bore of said plug 150 is the sleeve 152 which at its upper end is closed and at its lower end is split to form clamping jaws 154 which have an enlarged conical flange adapted to be engaged by said counter sink 148 for the closing of said jaws. Said sleeve 150 is formed to normally tend to move apart at the split portions to separate said jaws. A disc or plug 155 of packing material such as asbestos is mounted in the closed end of the sleeve 152 to serve as a closure for the end of glass tubing held thereagainst by said jaws 154, 154. A compression spring 156 mounted about said sleeve 152 with its lower end pressing against said shoulder 144 and its upper end pressing against the collar 150 tends to move said sleeve 152 upwardly to hold the clamping jaws thereon in a closed position. The bore of said sleeve 152 at the jaw members thereof is of a size to admit the insertion and the clamping in the closed position thereof of a piece of glass tubing 162 for example.

As indicated in Fig. 1 at one position of said handle 110, the upper end of said sleeve 152 is in operative relation to said spindle 90 and in the other position of said handle 110 the rod 134 is in operative relation to said spindle 90. In these positions downward movement of said spindle 90 through depression of said lever 73 by said crank handle 75 moves said sleeve 152 and said sleeve 130 respectively into a position to permit the opening of the jaws thereof.

Below said fires 25, 25 and the clamping device carried by said shaft 6 is the bed plate 170 supported by the posts 172, 172 and extending transversely past said standard 2. Slidable on said plate 170 by means of the chain 173 and sprockets 174, 174 is the block 175 which has an upwardly extending plate 176 at one end thereof. Said plate 176 carries rotatable therein and horizontally extending therefrom on one side a bushing 180, and aligned with said bushing 180 on the opposite side of said plate 176 is the conical shell 182 which carries the slidable chuck jaws 184, 184. Slidable in said bushing 180 and into said shell 182 is the hollow spindle 186 which carries a flange 188 which engages a lateral slot 190 formed on the inner edge of each of said jaws 184, 184. A compression spring 192 positioned about said spindle 186 with one end bearing against said bushing 180 and the other against a handle 194 fixed to said sleeve 186 tends to move said flange 188 to draw said jaws 184, 184 toward each other. Said jaws 184, 184 are opened by moving said handle 194 against the compression of said spring 192 to move said flange 188 in the direction away from said plate 176 to cause said jaws 184, 184 to slide outwardly on said cone 182 and thereby to move away from each other. Said flexible hose 82 connects to said hollow spindle 186 at a point outside said handle 194 and a hollow rubber tip 200 mounted to the opposite end of said spindle 186 serves to make connection to a piece of hollow glassware held between said clamp jaws 184, 184. At the end of plate 170 opposite said hose 82 is the downwardly extending gas jet 185.

As illustrated in Figs. 1, 2 and 3 a mercury switch body 202 of glass or the like has a tubulation 203 thereon clamped between said jaws 184, 184 and with its ends mounted about said hollow rubber tip 200.

In the use and operation of the machine above described, for example, for sealing electrode wires through the wall of said envelope 202 and for forming a tubulation on the side thereof the following process steps are made; with fires lit on said jets 25, 25 and with air pressure conected to said hose 82 through the hollow part of said handle 51 a switch body 202 held by said jaws 184 is moved to bring a cup 204 formed on the wall of said envelope 202 into contact with flames from said jet 185 to melt the glass thereat whereupon air pressure in the envelope is increased by shutting off escape of air from said pipe 84 to blow out the glass at said cup 204. The fires 25 are raised or lowered into proper position in relation to said well 204 through said handle 46, and they are rotated through a motor not shown driving said belt 47.

Through said handle 75 said clamp jaws 132, 132 are opened and a lead wire 142 having a glass bead 143 thereon is mounted between said jaws 132, 132 which are then allowed to close. By means of said handle 51 the wire and the glass bead 143 are moved downwardly to extend the end of the wire into the envelope 202 through the hole blown therethrough at said well 204 and the glass of said bead 143 and of envelope 202 at said blowout are fused and welded together to form a sealed joint between said wire 142 and the wall of said envelope 202, the glass thereat being properly worked by raising and lowering said handle 51 and by varying the air pressure within the envelope 202 by regulating the flow at said pipe 84. Another wire is sealed at another well 210 formed in the wall of the said envelope 202. A tubulation is made in the wall of the said envelope 202 at a point opposite said well 204 by rotating said body 202 with said chuck 184, 184 through an angle of 180° and sliding it with said plate 170 to a position to bring said point opposite well 204 underneath said gas jet 185 to melt the glass thereat to blow an opening through the wall thereat. Said handle 110 is then moved to bring said clamp 154 into operative relation with said spindle 90 which is actuated through said handle 75 to open said jaws 154 to admit a piece of glass tubing 162 which is clamped therein. The switch body 202 is then moved to a position beneath said tube 162 which latter by means of said handle 51 is lowered into operative relation with the blow out just formed and flames from said jets 25, 25 are moved into position to fuse the glass of said tube and said blow out. The glass at these two parts is then worked to join it to make a tight seal by raising and lowering said tube 162 toward and from said body 202 and by regulating the air pressure therein. The top of said sleeve 152 being closed, leakage of air outwardly through said tube 162 is retarded or completely prevented, as by holding it in said sleeve 152 with its end against said packing 155. The switch body is then removed from the clamps 184, 184 and completed by sealing off said tubulation 203 supplying a suitable quantity of mercury into said envelope 202 after which the atmosphere thereof is suitably cleaned and evacuated, and the envelope sealed off at said tubulation 162.

In Figs. 7 and 8 are shown alternate forms of a switch body handling means which comprises the clamping means above described and including said clamp jaws 184, 184 and also additional means which consists of a plate 220 slidable on said plate 175, a rod 222 being fixed to said plate 220 and extending through said plate 176 with a handle knob 224 thereon. A compression spring 226 mounted about said rod 222 and pressing at one end against plate 176 and at its other against handle 224 tends to move said plate 220 to a given position determined by a stop 228 mounted to said plate 175. Said plate 220 at its opposite end carries the upright standard 230 which carries the hollow socket member 232 thereon. Said socket 232 is rotatable on said standard 230 about a horizontal axis and carries at its outer end the handle member 234. In the interior of the socket opening 236 which faces said clamps 184, 184 said socket carries a somewhat resilient packing material 238 such as asbestos suitable for closing the end of glass tubing or the like held thereagainst. Adjustably mounted on said plate 220 and near plate 230 is the boss 239 which carries the positioning cup 240 of asbestos, fiber, or the like. This modified form of clamping means is adapted for holding a hollow glass body such as a switch body 242 which is open at each end, one end being held between said clamps 184, 184 and being connected with said rubber tip 200 and the other end being positioned in said socket 232, said packing means 238 being held against said switch body end to close it by means of said spring 226. Said switch body 242 has formed on one side thereof the well or hollow bulb 244 which in the mounting of said body 242 between said clamping means is positioned in said positioning cup 240. A tubulation is formed on said body 242 opposite said well 244 by bringing this point of the switch body underneath said gas jet 185 and blowing the glass through thereat and then fusing thereto the glass tubing 162 in the manner above described (see Fig. 4).

While I have shown and described and have pointed out in the annexed claims certain novel features of the invention, it will be understood that various omissions, substitutions and changes in the forms and details of the device illustrated and in its use and operation for performing different glass working operations and for joining different shaped glass parts may be made by those skilled in the art without departing from the spirit of the invention.

In a machine for making tubular glass devices, in combination means for supporting and closing a glass tube, for making connection adapted for applying air pressure to the interior of the tube, and for rotating a tube held thereby about its axis, means for heating the tube, means for holding a lead wire and a second tube at an angle to the first named tube and for moving each, in turn, to and from said first named tube, and means for applying pressure to the interior of the tube and for controlling the pressure.

Signed at Hoboken, in the county of Hudson and State of New Jersey, this 24th day of February, A. D. 1927.

GEORGE A. MILLAR.